US009876961B2

(12) United States Patent
Kojima

(10) Patent No.: US 9,876,961 B2
(45) Date of Patent: Jan. 23, 2018

(54) LIGHTING APPARATUS INCLUDING FIRST HOUSING AND SECOND HOUSING THAT CAN ROTATE WITH RESPECT TO THE FIRST HOUSING AND CONTROL METHOD

(71) Applicant: CANON KABUSHIKI KAISHA, Tokyo (JP)

(72) Inventor: Teruyuki Kojima, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 82 days.

(21) Appl. No.: 15/141,126

(22) Filed: Apr. 28, 2016

(65) Prior Publication Data

US 2016/0327261 A1 Nov. 10, 2016

(30) Foreign Application Priority Data

May 7, 2015 (JP) ................................. 2015-095236

(51) Int. Cl.
  *G03B 15/02* (2006.01)
  *H04N 5/235* (2006.01)
  *H04N 5/225* (2006.01)

(52) U.S. Cl.
  CPC ......... *H04N 5/2354* (2013.01); *H04N 5/2256* (2013.01)

(58) Field of Classification Search
  CPC ............ G03B 15/05; G03B 2215/0521; H04N 5/2354
  See application file for complete search history.

(56) References Cited

U.S. PATENT DOCUMENTS 8,160,435 B2 * 4/2012 Okubo ................... G03B 15/05
  396/175
2002/0025157 A1 * 2/2002 Kawakami ............. G03B 15/05
  396/155

FOREIGN PATENT DOCUMENTS

JP 2011170014 A 9/2011

* cited by examiner

*Primary Examiner* — Evan Dzierzynski
(74) *Attorney, Agent, or Firm* — Canon U.S.A., Inc. IP Division

(57) ABSTRACT

A setting unit does not set a limit angle of rotating a second housing by a driving unit with respect to a first housing in accordance with information output from a sensor configured to output information related to whether or not an object exists in a predetermined range until an elapsed time since an operation unit is operated exceeds a predetermined time, and the setting unit sets the limit angle in accordance with the information output from the sensor after the elapsed time since the operation unit is operated exceeds the predetermined time.

7 Claims, 10 Drawing Sheets

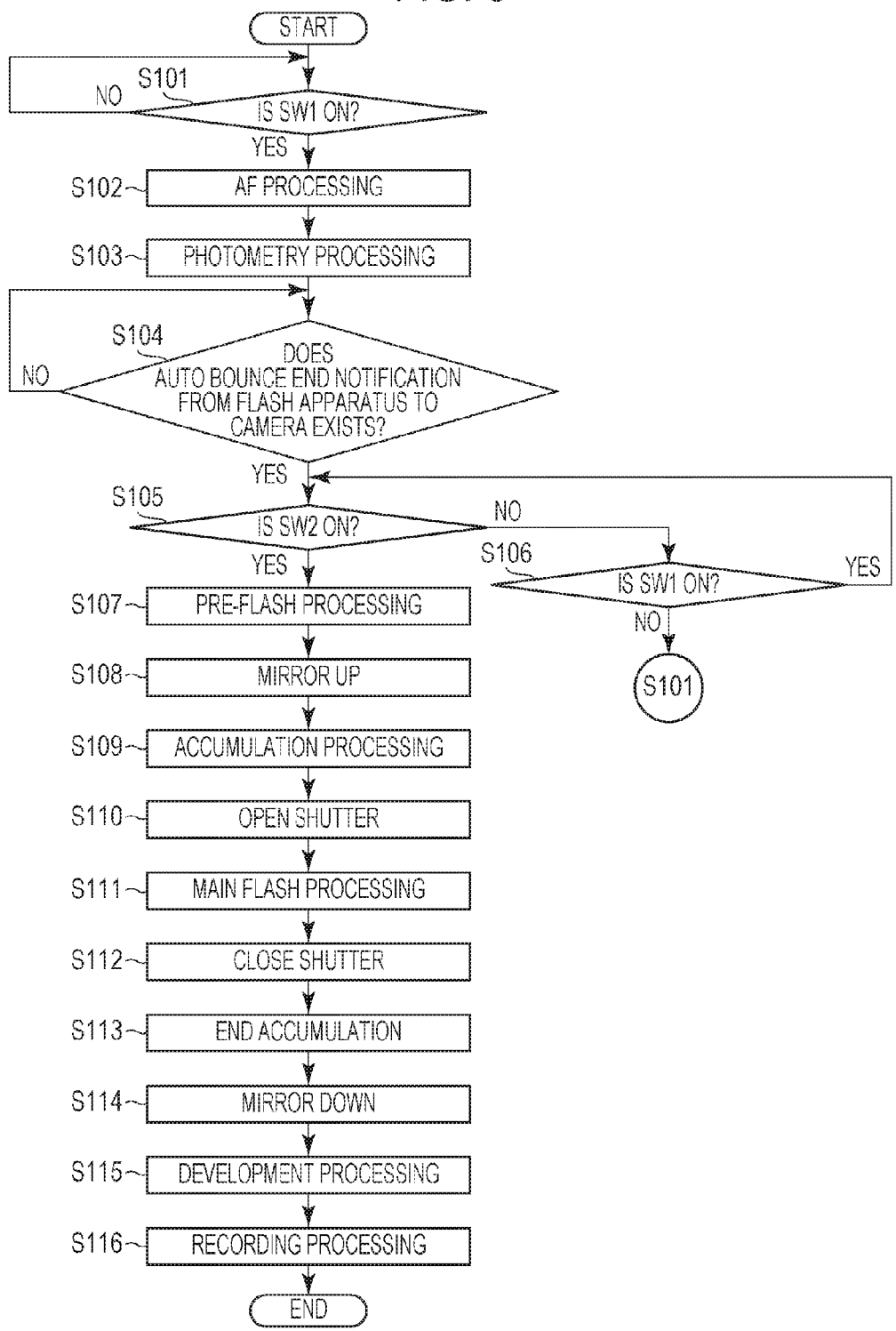

LIGHTING APPARATUS INCLUDING FIRST HOUSING AND SECOND HOUSING THAT CAN ROTATE WITH RESPECT TO THE FIRST HOUSING AND CONTROL METHOD

BACKGROUND OF THE INVENTION

Field of the Invention

The present invention relates to a lighting apparatus including a first housing and a second housing that can be rotated with respect to the first housing.

Description of the Related Art

Up to now, flash shooting has been proposed in which light is emitted from a lighting apparatus to a ceiling or the like, and a subject is irradiated with diffuse reflectance light from the ceiling or the like (hereinafter, which will be referred to as bounce flash shooting). According to the bounce flash shooting, since the subject can be indirectly irradiated with the light of the lighting apparatus instead of direct light irradiation, representation with soft light can be realized.

Furthermore, a technology for automatically determining an optimal irradiation direction in the bounce flash shooting has been also proposed. According to a technology proposed in Japanese Patent Laid-Open No. 2011-170014, in a flash apparatus that can automatically change a rotation angle of a light emission unit, a reflector is irradiated with light of the light emission unit while the rotation angle is set as an angle at which the light emission unit faces a user side instead of an angle at which the light emission unit faces a subject side.

However, according to the technology described in Japanese Patent Laid-Open No. 2011-170014, it is possible to irradiate the reflector with the light of the light emission unit by setting the rotation angle of the light emission unit at which the light emission unit faces the user side, but a case where the user is irradiated with the light of the light emission unit is not taken into account.

SUMMARY OF THE INVENTION

In view of the above, the present invention aims at reducing a probability that a user is irradiated with light from a lighting apparatus.

According to an aspect of the present invention, there is provided a lighting apparatus including: a first housing detachably attached to an image pickup apparatus; a second housing rotatable with respect to the first housing; a light emission unit provided to the second housing; a driving unit configured to rotate the second housing with respect to the first housing; a sensor configured to output information related to whether or not an object exists in a predetermined range; an operation unit configured to instruct the driving unit to rotate the second housing; and a setting unit configured to set a limit angle of rotating the second housing by the driving unit with respect to the first housing in accordance with the information output from the sensor, in which the setting unit does not set the limit angle in accordance with the information output from the sensor until an elapsed time since the operation unit is operated exceeds a predetermined time, and the setting unit sets the limit angle in accordance with the information output from the sensor after the elapsed time since the operation unit is operated exceeds the predetermined time.

Further features of the present invention will become apparent from the following description of exemplary embodiments with reference to the attached drawings.

BRIEF DESCRIPTION OF THE DRAWINGS

FIG. 8 illustrates an operation related to the bounce flash shooting of the image pickup apparatus according to the exemplary embodiment.

DESCRIPTION OF THE EMBODIMENTS

Hereinafter, exemplary embodiments of the present invention will be described in detail with reference to the accompanying drawings.

Figure 1A:
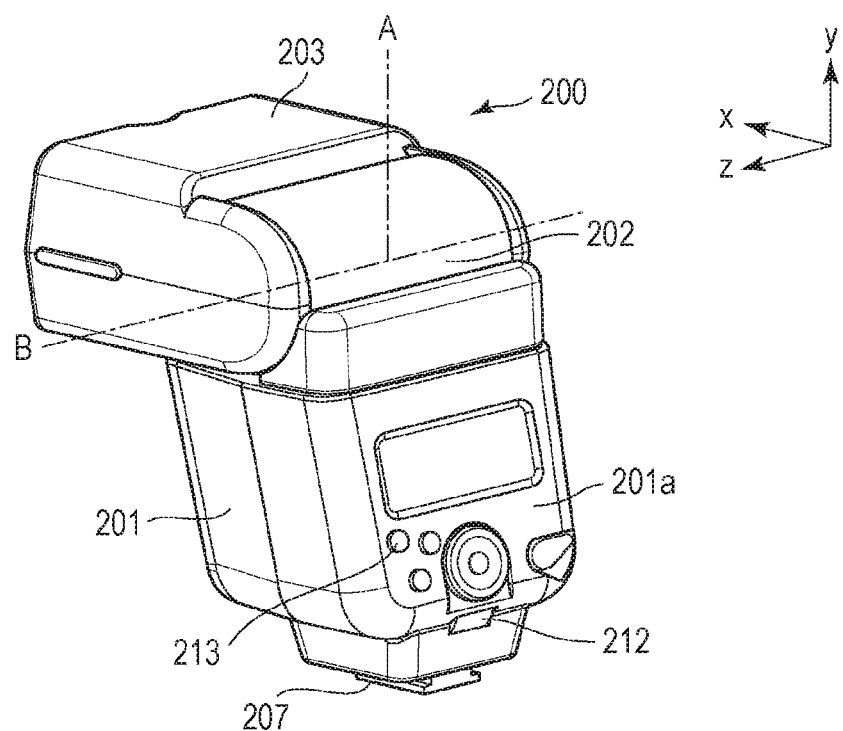
FIGS. 1A and 1B illustrate a lighting apparatus according to an exemplary embodiment.
Figure 1B:
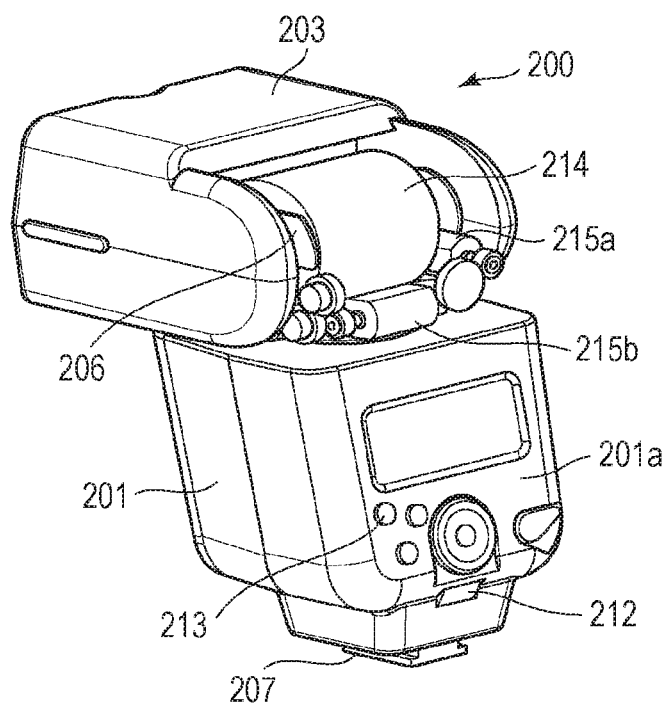
Figure 2:
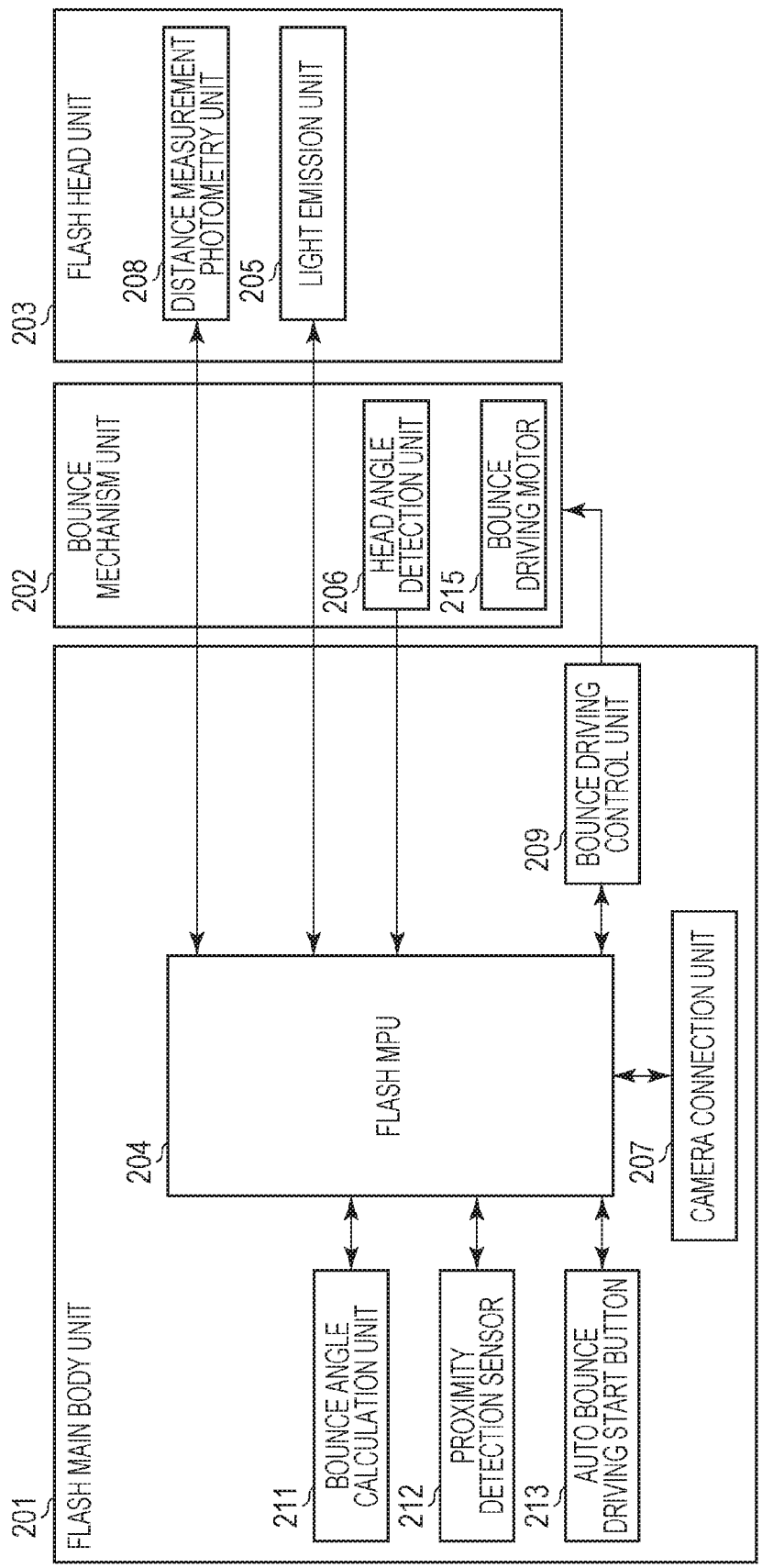
FIG. 2 is a block diagram illustrating a configuration of the lighting apparatus according to the exemplary embodiment.
Figure 3:
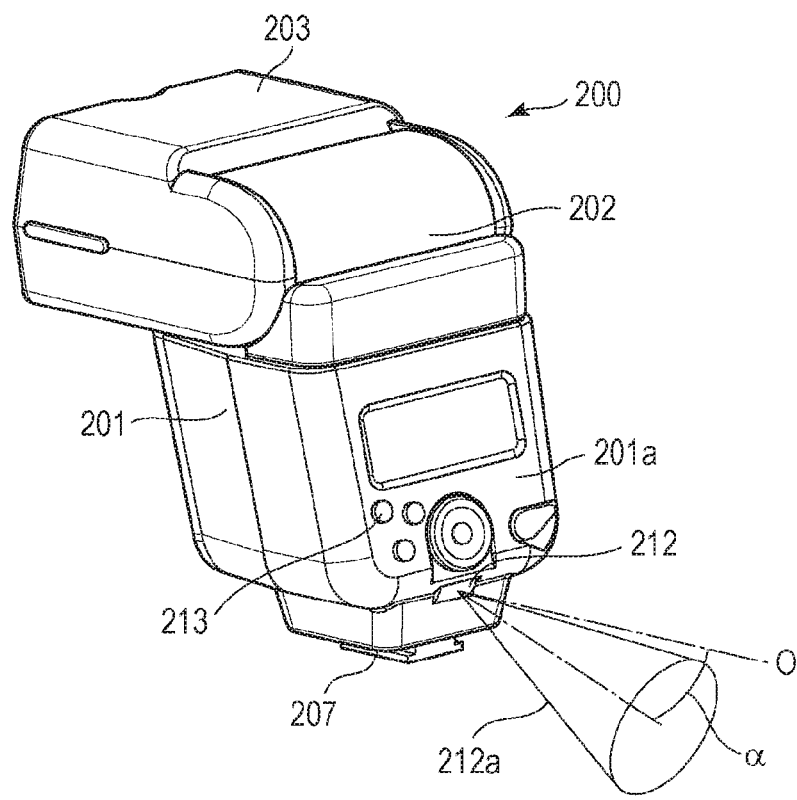
FIG. 3 illustrates a detection range of a proximity detection sensor of the lighting apparatus according to the exemplary embodiment.
Figure 4:
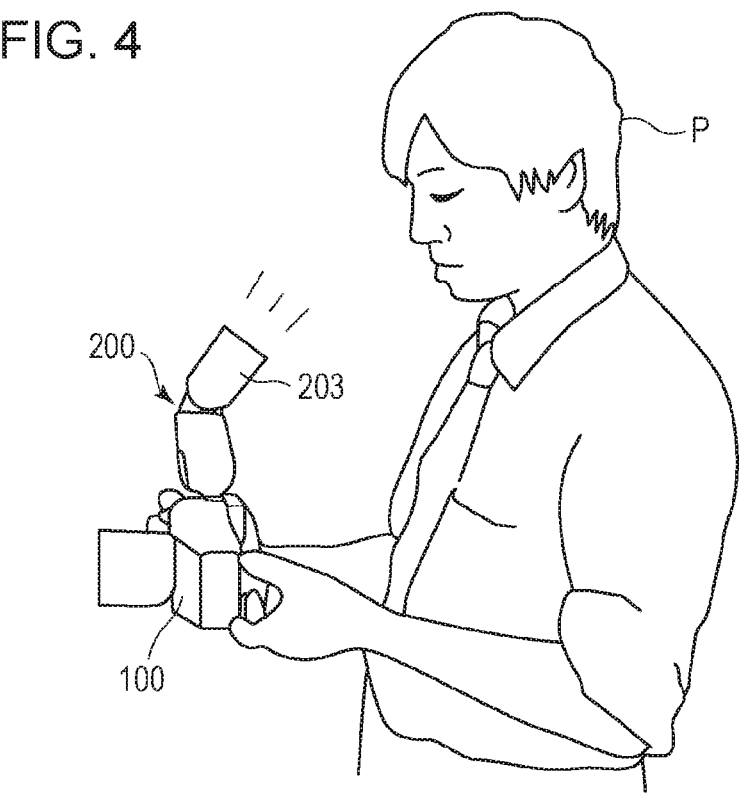
FIG. 4 illustrates a state in which bounce flash shooting is performed by using the lighting apparatus and an image pickup apparatus.

First, an external flash apparatus (hereinafter, which will be referred to as a flash apparatus) that can be detachably attached to an image pickup apparatus corresponding to a lighting apparatus of the present exemplary embodiment will be described with reference to FIGS. 1A and 1B, FIG. 2, FIG. 3, and FIG. 4. It should be noted that the same reference symbols are assigned to the same components in FIGS. 1A and 1B and FIG. 2. In addition, an x axis, a y axis, and a z axis of FIGS. 1A and 1B are orthogonal to one another. FIGS. 1A and 1B and FIG. 2 are explanatory diagrams for describing a configuration of the flash apparatus according to the present exemplary embodiment. FIG. 3 illustrates a range in which the flash apparatus according to the present exemplary embodiment can detect a proximal object. FIG. 4 illustrates a state in which the lighting apparatus is mounted to the image pickup apparatus to perform the bounce flash shooting.

A flash apparatus 200 according to the present exemplary embodiment is constituted by a flash main body unit 201 detachably attached to the image pickup apparatus, a bounce mechanism unit 202, and a flash head unit 203 corresponding to a movable portion that can be rotated with respect to the flash main body unit 201.

The flash main body unit 201 includes a micro controller (flash MPU) 204 configured to control the entirety of the flash apparatus that will be described below. The flash main body unit 201 also includes a battery, a power supply circuit, and the like that are not illustrated in the drawing.

As illustrated in FIG. 1A, part of the flash main body unit 201 serves as a main body unit operation face 201a. When the flash apparatus 200 is attached to a camera 100 as illustrated in FIG. 4, the main body unit operation face 201a is provided to be situated on a user side. In addition, the flash main body unit 201 is provided with an auto bounce driving start button 213 and a proximity detection sensor 212 which will be described below and the other various operation members and display members.

Furthermore, the flash main body unit 201 is provided with a camera connection unit 207 for attaching the flash main body unit 201 to an accessory shoe of the image pickup apparatus as illustrated in FIG. 1A. When an electric contact of the camera connection unit 207 is in contact with an electric contact of the accessory shoe of the image pickup apparatus, the flash apparatus 200 can communicate with the image pickup apparatus via the camera connection unit 207. It should be noted that, according to the present exemplary embodiment, a face of the flash main body unit 201 on which the camera connection unit 207 is provided is set as a lower face, and the main body unit operation face 201a is set as a back face. In other words, in a state in which the flash main body unit 201 is attached to the image pickup apparatus, the main body unit operation face 201a is a face on an opposite side to a face on a subject side in the flash main body unit 201.

The bounce mechanism unit 202 includes a main capacitor 214 that charges energy for causing a light emission unit 205, bounce driving motors 215a and 215b, a head angle detection unit 206, and the like.

The bounce mechanism unit 202 is coupled to the flash main body unit 201 so as to be able to rotate relatively with respect to the flash main body unit 201 while an axis A parallel with an axis Y in a state illustrated in FIG. 1A is set as a rotation center. The bounce mechanism unit 202 is rotated by a manual rotation operation by the user or the bounce driving motor 215a. As described above, when the face on the side where the camera connection unit 207 of the flash main body unit 201 is provided is set as the lower face, and the main body unit operation face 201a is set as the back face, the bounce mechanism unit 202 can be rotated in left and right directions relatively with respect to the flash main body unit 201.

The flash head unit 203 includes the light emission unit 205 that emits light at the time of the flash shooting or the like and a distance measurement photometry unit 208 that measures reflected light from the object irradiated with the light of the light emission unit 205. The light emission unit 205 is provided with a flash light emission circuit that is not illustrated in the drawing which emits flash light in accordance with a light emission signal from a flash MPU 204. The light emission unit 205 is also provided with a light source used for the light emission (for example, a discharge tube such as a xenon tube), a reflection umbrella, a Fresnel lens, and the like. It should be noted that the light source is not limited to the discharge tube such as the xenon tube, and an LED may be used. In the case of a configuration using the LED as the light source, a large capacitor such as the main capacitor 214 is not needed.

The flash head unit 203 is coupled to the bounce mechanism unit 202 so as to be able to rotate relatively with respect to the bounce mechanism unit 202 while an axis B in parallel with an axis Z is set as rotation center in the state illustrated in FIG. 1A. The flash head unit 203 is rotated by the manual rotation operation by the user or the bounce driving motor 215b. As described above, when the face on the side where the camera connection unit 207 of the flash main body unit 201 is provided is set as the lower face, and the main body unit operation face 201a is set as the back face, the flash head unit 203 can be rotated in the up and down directions relatively with respect to the bounce mechanism unit 202. From the above-described configuration, it can be mentioned that the flash head unit 203 can be rotated in the left and right directions and up and down directions relatively with respect to the flash main body unit 201. It should be noted that, when the state in which the axis A is in parallel with the axis Y and the axis B is in parallel with the axis Z as illustrated in FIG. 1A is set as a reference position of the flash head unit 203, a central axis of the light emitted from the light emission unit 205 in the reference position (center of the irradiation direction of the light from the light emission unit 205) is in parallel with an X axis. In addition, according to the present exemplary embodiment, the flash head unit 203 can be rotated with respect to the flash main body unit 201 from the reference position at 180 degrees in the right direction, 180 degrees in the left direction, 120 degrees in the up direction, and 0 degree in the down direction.

The head angle detection unit 206 detects a relative rotation angle of the flash head unit 203 with respect to the flash main body unit 201 by a rotation angle detection sensor constituted by a substrate having a phase pattern and a contact brush and outputs the relative rotation angle to the flash MPU 204.

The distance measurement photometry unit 208 measures the reflected light from the object irradiated with the light of the light emission unit 205 by a light reception sensor of the distance measurement photometry unit 208 and outputs the measurement result to the flash MPU 204. The light reception sensor of the distance measurement photometry unit 208 is arranged at a position where it is easy to measure the reflected light from the object irradiated with the light of the light emission unit 205 (for example, a leading end part of the flash head unit 203) such that a light reception surface faces the irradiation direction of the light from the light emission unit 205.

The flash MPU 204 calculates a distance of the object irradiated with the light of the light emission unit 205 on the basis of the measurement result of the distance measurement photometry unit 208. For example, the measurement result measured by the distance measurement photometry unit 208 when the object having a reference reflectance which is located at a reference distance is irradiated with the light of the light emission unit 205 at a reference light emission amount is previously obtained through an experiment or the like and stored in a memory built in the flash MPU 204. The flash MPU 204 calculates a distance of the object located in a case where the object has the reference reflectance on the basis of the actual light amount of the light emission unit 205 and the measurement result actually measured by the distance measurement photometry unit 208. While the thus calculated distance is set as the distance of the object irradiated with the light of the light emission unit 205, it is possible to calculate the distance of the object irradiated with the light of the light emission unit 205 on the basis of the measurement result of the distance measurement photometry unit 208. It should be noted that the calculation method for the distance is not limited to the method described herein. For example, other methods in a related art such as a trigonometrical survey method and a laser distance measurement method may also be employed.

The distance of the object calculated in this manner on the basis of the measurement result of the distance measurement photometry unit 208 is used for determining the angle of the flash head unit 203 at the time of auto bounce driving control by a bounce angle calculation unit 211. For example, the flash MPU 204 calculates the distance of the subject by using the distance measurement photometry unit 208 and also calculates the distance of the reflector that reflects the light from the light emission unit 205 at the time of the bounce flash shooting. The bounce angle calculation unit 211 determines the angle of the flash head unit 203 that is optimal for the bounce flash shooting (irradiation direction of the light from the light emission unit 205) on the basis of the calculated distance of the subject and the calculated distance of the reflector. Herein, while the distance of the subject is set as D, the distance of the reflector is set as d, and the rotation angle corresponding to the optimal irradiation direction from the reference position of the flash head unit 203 is set as θ, the angle is determined by the following expression (1).

$$\theta = \tan^{-1}(2d/D) \quad (1)$$

It should be noted that the determination method for the angle of the flash head unit 203 is not limited to the method described herein, and other methods in a related art may also be employed.

A bounce driving control unit 209 controls the bounce driving motors 215a and 215b in accordance with signals from the flash MPU 204 to rotate the flash head unit 203 in the left and right directions and up and down directions with respect to the flash main body unit 201.

The proximity detection sensor 212 is a sensor configured to detect an object within a predetermined detection range such as an infrared sensor or an ultrasonic distance sensor in a related art. As illustrated in FIGS. 1A and 1B, the proximity detection sensor 212 is arranged in the center of the left and right directions of the main body unit operation face 201a of the flash main body unit 201. The proximity detection sensor 212 is arranged above the camera connection unit 207 and underneath an area in the vicinity of various operation members and display members provided on the main body unit operation face 201a. That is, the proximity detection sensor 212 is arranged on a face on an opposite side to the face on the subject side in the flash main body unit 201 in a state in which the flash main body unit 201 is attached to the image pickup apparatus. In addition, the proximity detection sensor 212 is arranged at the center of the left and right directions of the flash main body unit 201 as seen from a side where the proximity detection sensor 212 in the flash main body unit 201 is provided. Moreover, the proximity detection sensor 212 is arranged at a position closer to the flash head unit 203 than the camera connection unit 207.

In a case where an object is detected, the proximity detection, sensor 212 outputs a detection result indicating that "the proximal object exists" to the flash MPU 204. It should be noted that, in a case where an object is not detected, the proximity detection sensor 212 may output a detection result indicating that "no proximal object exists" to the flash MPU 204.

As illustrated in FIG. 3, the proximity detection sensor 212 has a detection range 212a. A range in which a distance in a predetermined direction from the position of the proximity detection sensor 212 is lower than a predetermined value is set as the detection range 212a. It should be noted however that, if the detection range is too wide, a face of the user is detected even in a state in which the face of the user is away from a viewfinder of the camera 100. Therefore, for example, up to 10 cm from the position of the proximity detection sensor 212 is preferably set as the detection range.

The center of the detection range 212a is inclined downwardly with respect to the main body unit operation face 201a. Specifically, in a state in which the flash head unit 203 is at the reference position with respect to the flash main body unit 201, the center of the detection range 212a is set to be inclined downwardly by an angle α with respect to an axis O that is in parallel with the central axis of the light emitted from the light emission unit 205 and passes through the proximity detection sensor 212.

In this manner, while the detection range 212a is set to be inclined downwardly, it is facilitated for the user to be within the detection range when the user looks into the viewfinder of the camera 100. It should be noted that the inclination angle α of the proximity detection sensor 212 is preferably set to be at an angle higher than or equal to 5 degrees and lower than or equal to 45 degrees while the range of the detection range 212a and the distance of the proximity detection sensor 212 from the camera 100 are taken into account. With this configuration, the user can be accurately detected when the user looks into the viewfinder of the camera 100 irrespective of an orientation (orientation of the flash apparatus 200) when the user holds the camera 100.

It should be noted that the proximity detection sensor 212 has been described above as the sensor configured to detect the object within the predetermined detection range, but a sensor configured to measure a distance to the object is also included in the proximity detection sensor 212 since it is possible to find out whether or not the object is within the predetermined detection range on the basis of the measured distance. In the case of the above-described sensor configured to measure the distance to the object, the flash MPU 204 may determine whether "the proximal object exists" or "no proximal object exists" on the basis of the measurement result of the sensor (output of the sensor).

The auto bounce driving start button 213 is operated by the user to start an operation for determining the angle of the flash head unit 203 appropriate to the bounce flash shooting (irradiation direction of the light from the light emission unit 205) (hereinafter, which will be referred to as an auto bounce operation).

Figure 5:
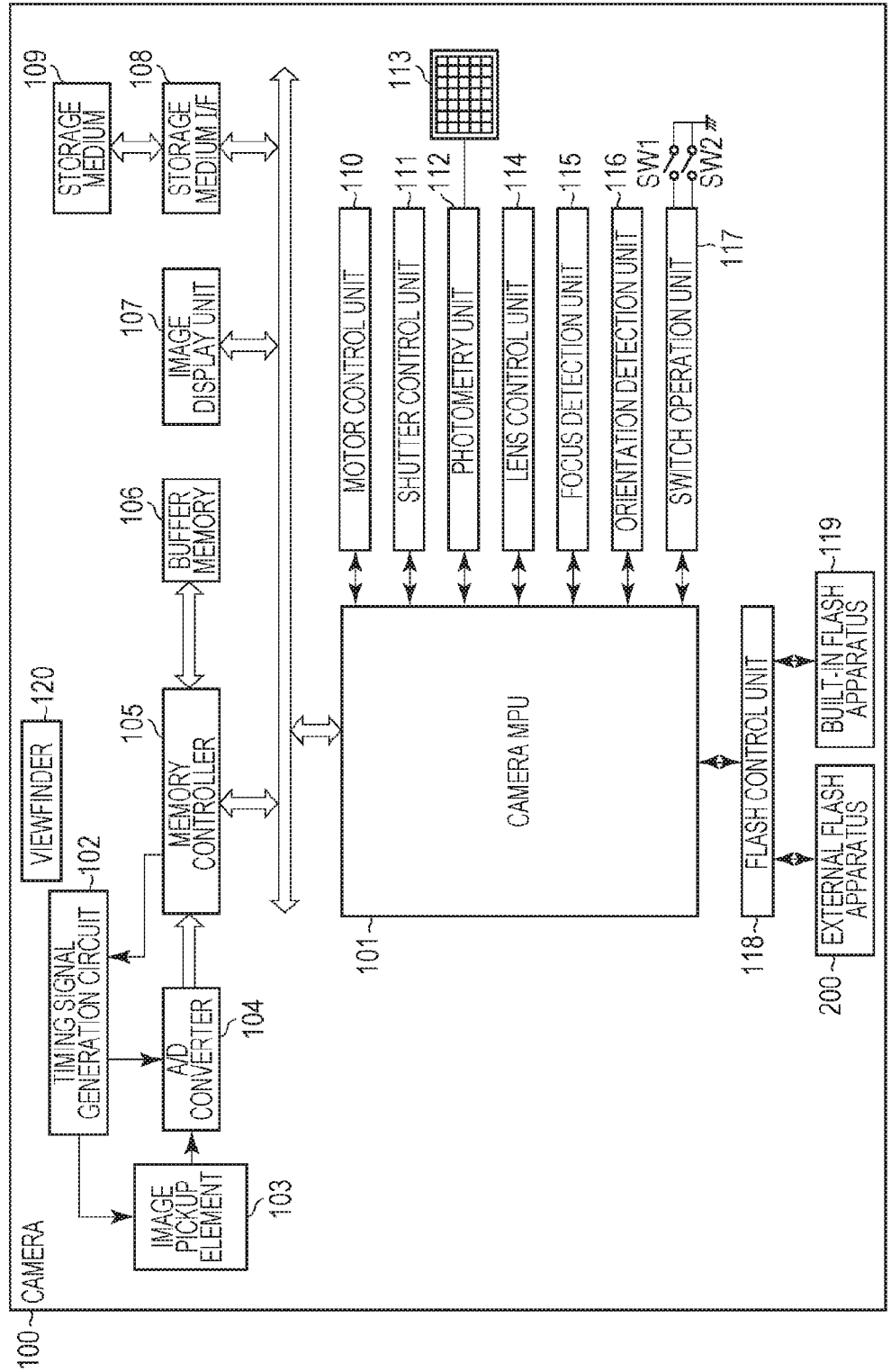
FIG. 5 is a block diagram illustrating a configuration of the image pickup apparatus according to the exemplary embodiment.

Next, the camera 100 corresponding to the image pickup apparatus according to the present exemplary embodiment will be described with reference to FIG. 5.

A micro controller (hereinafter, which will be referred to as a camera MPU) 101 controls the entirety of the camera 100 including a shooting sequence and the like.

An image pickup element 103 is an image pickup element such as a CCD or a CMOS that photoelectrically converts the light from the subject and accumulates charges. A timing signal generation circuit 102 generates timing signals used for operating the image pickup element 103. An analog-to-digital (A/D) converter 104 converts analog image data read out from the image pickup element 103 into digital image data. A memory controller 105 is a controller configured to control read and write of the memory, a refresh operation of a buffer memory 106, and the like.

An image display unit 107 is a liquid crystal panel or an organic EL panel that displays image data accumulated in a buffer memory, image data recorded in a storage medium 109, a menu screen, and the like. The image display unit 107 is provided on the back face of the camera 100. The image display unit 107 can also execute a function of consecutively displaying picked-up images obtained through a continuous image pickup operation by the image pickup element 103, and the function is so called a live-view function. An interface 108 is an interface for establishing a connection to a recording medium, and the storage medium 109 is a recording medium such as a memory card or a hard disc drive that can record image data.

A motor control unit 110 controls a motor that is not illustrated in the drawing to perform up and down operations of a mirror that is not illustrated in the drawing in accordance with signals from the camera MPU 101. A shutter control unit 111 drives a mechanical shutter that is not illustrated in the drawing in accordance with the signals from the camera MPU 101. A photometry unit 112 performs photometry for each of a plurality of photometry areas by a photometry sensor 113 and outputs a photometry result to the camera MPU 101. The camera MPU 101 converts this luminance signal by an analog-to-digital (A/D) converter that is not illustrated in the drawing and performs calculation for exposure control values such as an aperture value (AV) for exposure control, a shutter speed (TV), and a sensitivity of the image pickup element (ISO). Similarly, the photometry unit 112 also outputs a luminance value when pre-flash is performed towards the subject by a built-in flash apparatus 119 or the detachable flash apparatus 200 to the camera MPU 101 and calculates the light emission amount at the time of the shooting.

A lens control unit 114 communicates with a lens MPU of a shooting lens connected via a lens mount contact that is not illustrated in the drawing and operates a lens driving motor and a lens stop motor in the shooting lens to control focus adjustment and stop of the shooting lens. A focus detection unit 115 has a function of detecting a de-focus amount with respect to the subject for autofocus (AF) by using a phase difference detection method or the like in a related art. It should be noted that an image pickup apparatus of a lens built-in type in which the shooting lens is not detachable may also be used.

An orientation detection unit 116 detects an inclination of the camera 100 with respect to a rotation direction while a shooting optical axis is set as the center by using a gyro sensor or the like. When SW1 is turned ON at a first stroke, and a switch operation unit 117 detects that SW1 is turned ON, the camera MPU 101 starts AF and photometry when SW2 is turned ON at a second stroke, and the switch operation unit 117 detects that SW2 is turned ON, the camera MPU 101 starts shooting.

The flash control unit 118 controls the built-in flash apparatus 119 or the detachable flash apparatus 200 in accordance with the signals from the camera MPU 101. The camera MPU 101 performs communications with the built-in flash apparatus 119 and the detachable flash apparatus 200 via the flash control unit 118. It should be noted that the flash control unit 118 includes the accessory shoe that can be connected to the camera connection unit 207 of the flash apparatus 200 described above. The accessory shoe that can be connected to the camera connection unit 207 is provided on a top face of the camera 100.

A viewfinder 120 is a subject observation unit configured to observe a subject image that is incident by passing through the shooting lens and is reflected by the mirror that is not illustrated in the drawing, and the user can check a framing by looking into the viewfinder 120. The viewfinder 120 is provided on an upper part of the back face of the camera 100 so that the user can easily look into the viewfinder 120 in a shooting orientation. According to the present exemplary embodiment, the accessory shoe and the viewfinder 120 of the camera 100 are provided at the center in the left and right directions of the camera 100. It should be noted that the viewfinder 120 may be so called an electronic viewfinder for observing an image obtained when the image pickup element 103 or a separately provided image pickup element different from the image pickup element 103 performs shooting instead of an optical viewfinder for observing the subject image reflected by the mirror that is not illustrated in the drawing.

Figure 6A:
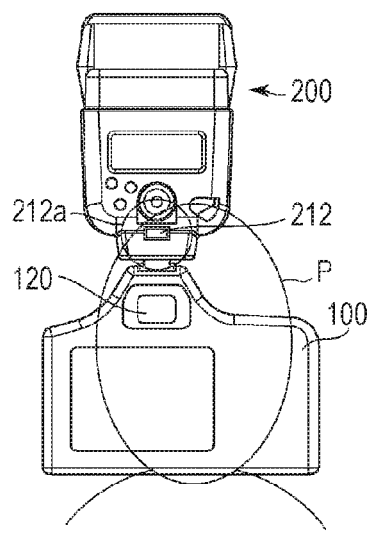
FIGS. 6A to 6D illustrate a relationship between an orientation of the lighting apparatus according to the exemplary embodiment and the detection range of the proximity detection sensor.
Figure 6B:
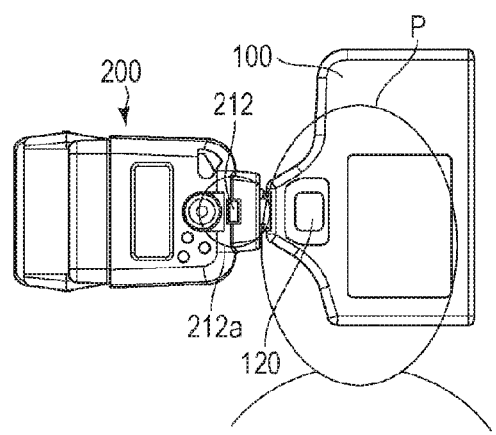
Figure 6C:
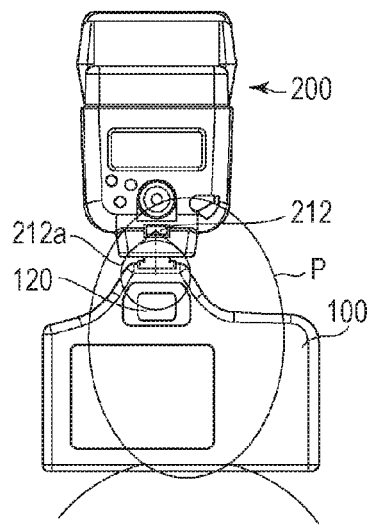
Figure 6D:
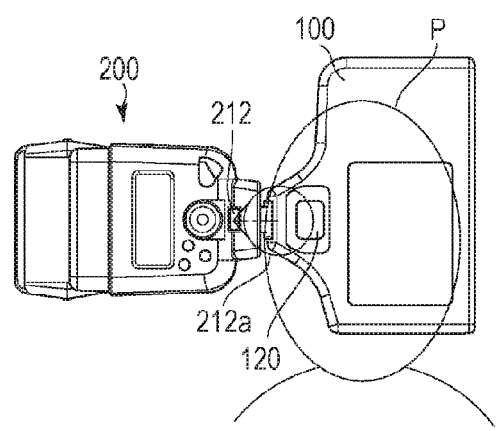

Next, a relationship between the orientation of the flash apparatus 200 and the detection range 212a of the proximity detection sensor 212 will be described with reference to FIGS. 6A to 6D. FIG. 6A illustrates a positional relationship between the user and the detection range 212a in a state in which the up and down directions of the camera 100 are set to be parallel with a gravity direction without inclining the detection range 212a. FIG. 6B illustrates a positional relationship between the user and the detection range 212a in a state in which the up and down directions of the camera 100 are set to be orthogonal to the gravity direction without inclining the detection range 212a. FIG. 6C illustrates a positional relationship between the user and the detection range 212a in a state in which the up and down directions of the camera 100 are set to be parallel with the gravity direction by inclining the detection range 212a. FIG. 6D illustrates a positional relationship between the user and the detection range 212a in a state in which the un and down directions of the camera 100 are set to be orthogonal to the gravity direction by inclining the detection range 212a. Hereinafter, the orientation of the camera 100 in a state in which the up and down directions are set to be parallel with the gravity direction will be referred to as a regular position, and the orientation of the camera 100 in a state in which the up and down directions are set to be orthogonal to the gravity direction will be referred to as a vertical position.

As illustrated in FIG. 6A, when a user P looks into the viewfinder 120 in a state of the regular position, the user enters the detection range 212a, so that it is possible to detect the user situated in the vicinity of the flash apparatus 200. On the other hand, as illustrated in FIG. 6B, when the user P looks into the viewfinder 120 in a state of the vertical position, the user is away from the center of the detection range 212a, and the user situated in the vicinity of the flash apparatus 200 is not detected in some cases.

In contrast to the above-described configurations, when the detection range 212a is inclined downwardly, when the user P looks into the viewfinder 120 in the state of the regular position or the vertical position, the user enters the center of the detection range 212a as illustrated in FIGS. 6C and 6D. For this reason, it is possible to accurately detect the user situated in the vicinity of the flash apparatus 200.

Next, operations performed by the user with respect to the flash apparatus 200 will be described with reference to FIGS. 7A and 7B.

As described above, the various operation members and display members such as the auto bounce driving start button 213 are provided on the back face of the flash apparatus 200.

For this reason, when the user operates the auto bounce driving start button 213, if a hand of the user enters the detection range 212a, it may be erroneously detected that the state is a viewfinder shooting state in which the user looks into the viewfinder 120 in some cases even when the actual state is a live-view state. In view of the above, as illustrated in FIGS. 7A and 7B, the auto bounce driving start button 213 is preferably arranged at a location where it is difficult for the hand of the user to enter the detection range 212a when the user operates the auto bounce driving start button 213.

Figure 7A:
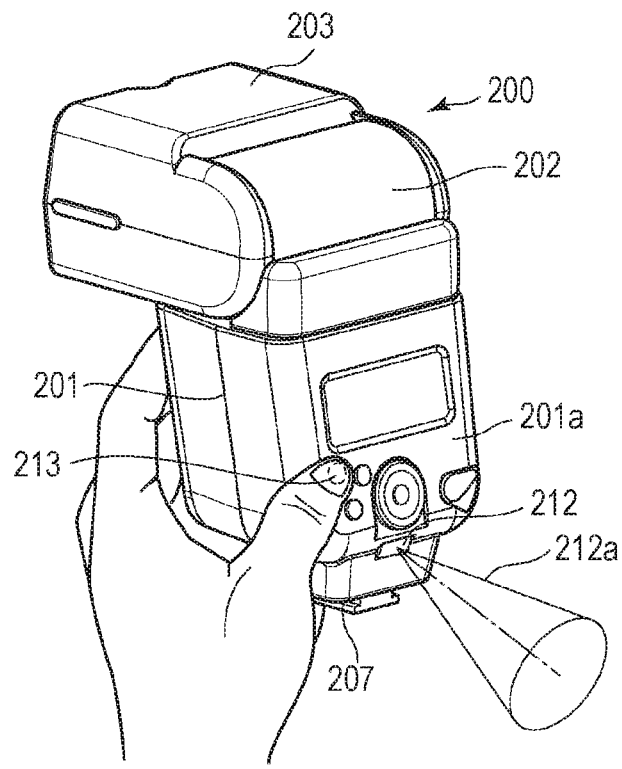
FIGS. 7A and 7B illustrate a user operation with respect to the lighting apparatus according to the exemplary embodiment.

In FIG. 7A, the auto bounce driving start button 213 is arranged at a position away from the proximity detection sensor 212 in an upper left direction in the main body unit operation face 201a as seen from the user. With this configuration, the user can easily operate the auto bounce driving start button 213 by the left hand by holding a grip portion provided in the vicinity of the right side face of the camera 100 by the right hand while the hand does not enter the detection range 212a.

Figure 7B:
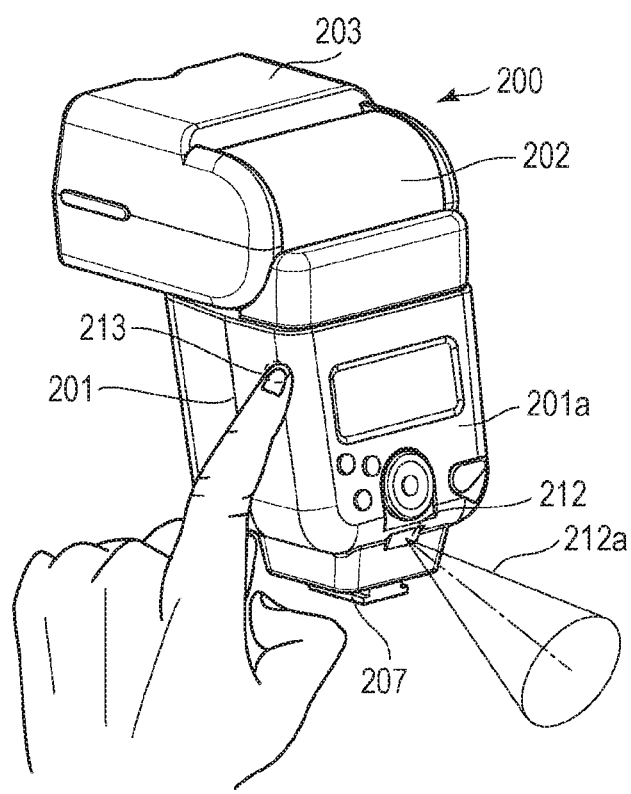

In FIG. 7B, the auto bounce driving start button 213 is arranged on the left side face of the flash main body unit 201. Similarly as in the position illustrated in FIG. 7A, the user can easily operate the auto bounce driving start button 213 by the left hand in the position illustrated in FIG. 7B too by holding the grip portion provided in the vicinity of the right side face of the camera 100 by the right hand while the hand does not enter the detection range 212a. That is, the proximity detection sensor 212 is arranged at the position on the right side with respect to the position where the auto bounce driving start button 213 is provided in the flash main body unit 201 as seen from the side where the proximity detection sensor 212 is provided in the flash main body unit 201. In addition, the proximity detection sensor 212 is arranged at the position on the lower side with respect to the position where the auto bounce driving start button 213 is provided in the flash main body unit 201 as seen from the side where the proximity detection sensor 212 is provided in the flash main body unit 201.

It should be noted that the arrangement example of the auto bounce driving start button 213 has been described according to the present exemplary embodiment, and when the operation member corresponding to the operation controlled on the basis of the detection result of the proximity detection sensor 212 is arranged on the basis of a similar concept to the above-described concept, it is possible to avoid the erroneous operation.

Next, an operation related to the bounce flash shooting will be described with reference to FIG. 8 and FIG. 9.

Figure 9:
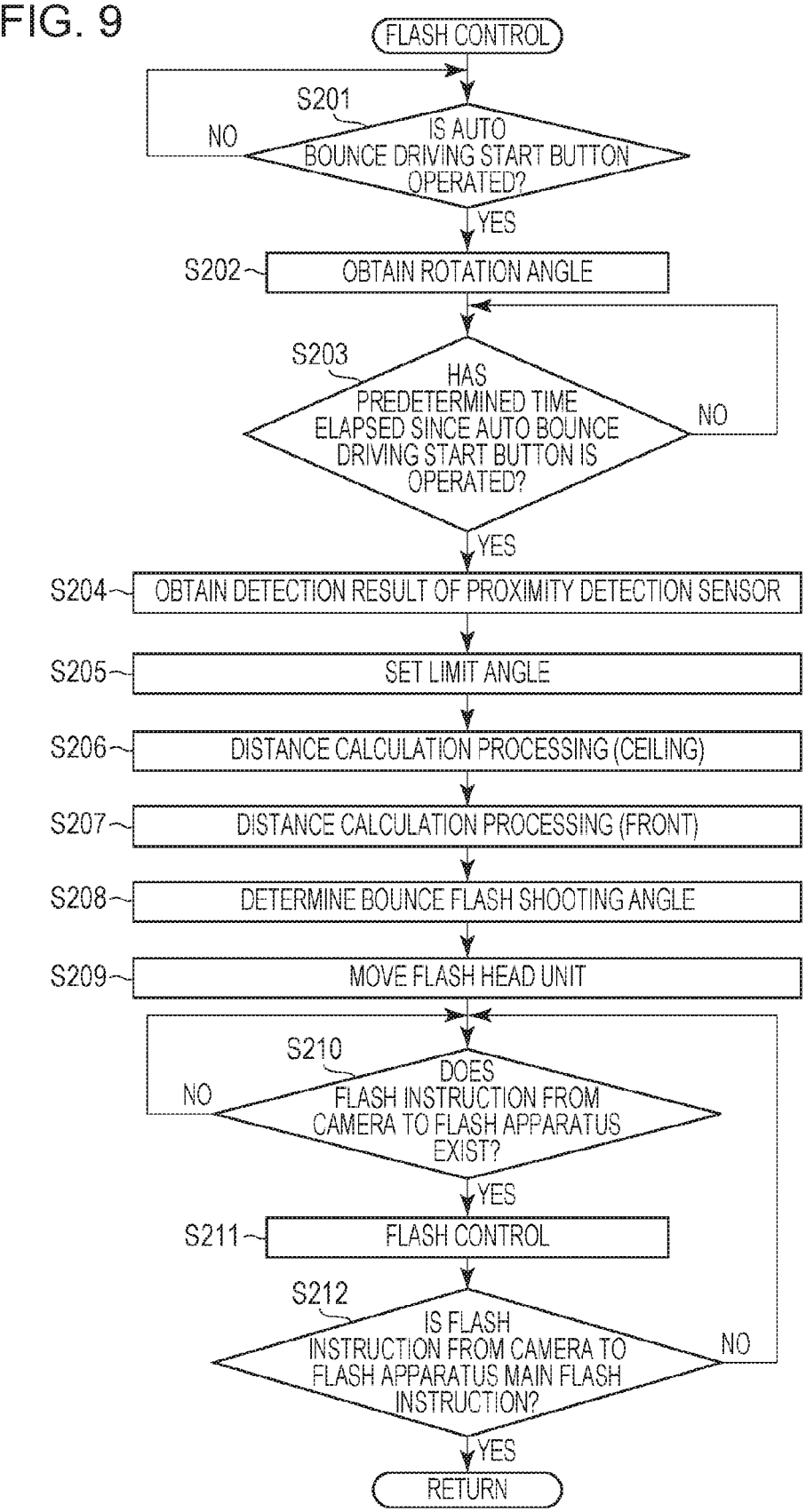
FIG. 9 illustrates an operation related to the bounce flash shooting of the lighting apparatus according to the exemplary embodiment.

FIG. 8 illustrates an operation flow chart of the camera 100, and FIG. 9 illustrates an operation flow chart of the flash apparatus 200.

First, the operation of the camera 100 related to the bounce flash shooting will be described with reference to FIG. 8. The processing in FIG. 8 is repeatedly executed in a state in which an operation mode of the camera 100 is set as a shooting mode. The camera 100 is connected to the flash apparatus 200 by the accessory shoe.

In step S101, the camera MPU 101 performs state detection of SW1 of the switch operation unit 117. In a case where SW1 is ON, the flow shifts to step S102, and in a case where SW1 is OFF, the state detection of SW1 is continued.

In step S102, the camera. MPU 101 controls the focus detection unit 115 and the lens control unit 114 to perform autofocus processing (AF processing).

In step S103, the camera. MPU 101 controls the photometry unit 112 to perform photometry processing. The camera MPU 101 also performs the calculation for the exposure control values such as the aperture value (AV) for the exposure control, the shutter speed (TV), and the sensitivity of the image pickup element (ISO) on the basis of the photometry result of the photometry unit 112.

In step S104, the camera MPU 101 checks an end notification of the auto bounce operation from the flash apparatus 200. When the end notification is obtained, it is determined that the auto bounce has been ended, and the flow shifts to step S105. When the end notification is not obtained, the checking of the end notification is continued.

In step S105, the camera. MPU 101 performs state detection of SW2 of the switch operation unit 117. In a case where SW2 is ON, the flow shifts to step S107, and in a case where SW2 is OFF, the flow shifts to step S106.

In step S106, the camera MPU 101 performs the state detection of SW1 similarly as in step S101. In a case where SW2 is ON, the flow shifts to step S107, and in a case where SW2 is OFF, the flow shifts to step S101.

In step S107, the camera MPU 101 performs pre-flash processing. As the pre-flash processing, first, the camera MPU 101 instructs the flash control unit 118 to prepare pre-flash. The flash control unit 118 transmits an instruction of the pre-flash at a predetermined light amount to the flash apparatus 200, and the flash apparatus 200 starts the pre-flash. The camera MPU 101 calculates a light emission amount at the time of the shooting on the basis of a photometry value obtained by the photometry unit 112 at the time of this pre-flash.

Next, in step S108, the camera MPU 101 controls the motor control unit 110 to move the mirror that is not illustrated in the drawing upwardly. Since the mirror is moved upwardly, light flux that has passed through the shooting lens is not reflected by the mirror and is guided to the image pickup element 103.

In step S109, the camera MPU 101 starts charge accumulation in the image pickup element 103. It should be noted that, since the image pickup element 103 is shielded from light by the mechanical shutter that is not illustrated in the drawing at this time, even when the charge accumulation is started, the accumulated charges are at a negligible level.

In step S110, the camera MPU 101 controls the shutter control unit 111 to drive the mechanical shutter that is not illustrated in the drawing to establish a state in which the image pickup element 103 is exposed with light. The image pickup element 103 in the exposed state accumulates charges in accordance with the amount of incident light.

In step S111, the camera MPU 101 performs main flash processing. As the main flash processing, the camera MPU 101 instructs the flash control unit 118 to perform main flash at the light emission amount calculated in step S107. The flash control unit 118 transmits a main flash instruction at the calculated light emission amount to the flash apparatus 200, and the flash apparatus 200 starts the main flash. It should be noted that the exposure control is performed by using the exposure control value calculated in step S103 for the flash shooting at this time.

In step S112, the camera MPU 101 controls the shutter control unit 111 to drive the mechanical shutter that is not illustrated in the drawing to establish a state in which the image pickup element 103 is shielded from light.

In step S113, the camera MPU 101 ends the charge accumulation in the image pickup element 103. As described above, a period in which the charge accumulation is performed by the image pickup element. 103 is longer than a period in which the image pickup element 103 is exposed with light. The charges accumulated in the image pickup element 103 in the state of being shielded from light are at a negligible level as described above. For this reason, the period in which the image pickup element 103 is exposed with light may be set as a charge accumulation period, and a length of the period in which the image pickup element 103 is exposed with light (exposure time) may be set as a charge accumulation time.

In step S114, the camera MPU 101 controls the motor control unit 110 to move the mirror that is not illustrated in the drawing downwardly. Since the mirror is moved downwardly, the light flux that has passed through the shooting lens is reflected by the mirror and is not guided to the image pickup element 103 but is guided to the viewfinder 120.

In step S115, the camera MPU 101 causes the A/D converter 104 to convert the analog image data read out from the image pickup element 103 into the digital image data, and the digital image data is temporarily stored in the buffer memory 106. When all pieces of the digital image data are stored in the buffer memory 106, the camera MPU 101 applies predetermined development processing to the digital image data and creates image data.

In step S116, the camera MPU 101 records the created image data in the storage medium. 109 via a storage medium. I/F 108 as an image file and ends the series of shooting processing.

It should be noted that, in a case where the live-view function is executed, step S108 is omitted since the mirror is in the state of being up. Furthermore, with regard to the shutter too, since the image pickup element 103 is in the state of being exposed with light, step S110 is also omitted. In a case where the live-view function is resumed after the flash shooting, step S112 and step S114 may be omitted.

Next, an operation of the flash apparatus 200 related to the bounce flash shooting will be described with reference to FIG. 9.

In step S201, the flash MPU 204 checks whether or not the auto bounce driving start button 213 is operated. When the auto bounce driving start button 213 is operated, the flow shifts to step S202, and when the auto bounce driving start button 213 is not operated, the flow returns to step S201.

In step S202, the flash MPU 204 obtains a relative rotation angle of the flash head unit 203 in the left and right directions and the up and down directions detected by the head angle detection unit 206. This detection result of the rotation angle may be a result immediately before the auto bounce driving start button 213 is operated or a result obtained when the detection is newly performed after the auto bounce driving start button 213 is operated.

In step S203, the flash MPU 204 checks whether or not the elapsed time since the auto bounce driving start button 213 is operated exceeds a predetermined time. When the elapsed time since the auto bounce driving start button 213 is operated exceeds the predetermined time, the flow shifts to step S204, and the elapsed time does not exceed the predetermined time, step S203 is repeatedly performed.

As illustrated in FIGS. 7A and 7B, the auto bounce driving start button 213 is arranged at a position where it is difficult for the hand of the user to enter the detection range 212a when the user operates the auto bounce driving start button 213. However, depending on an operation method of the user, when the user operates the auto bounce driving start button 213, it is conceivable that the hand of the user may enter the detection range 212a. In view of the above, according to the present exemplary embodiment, the detection result of the proximity detection sensor 212 is not used until the elapsed time since the user operates the auto bounce driving start button 213 exceeds the predetermined time. As a method in which the detection result of the proximity detection sensor 212 is not used, for example, a method in which the detection result of the proximity detection sensor 212 obtained before the elapsed time since the user operates the auto bounce driving start button 213 exceeds the predetermined time is not used may be employed. In addition, a method in which the detection is not performed by the proximity detection sensor 212 until the elapsed time since the user operates the auto bounce driving start button 213 exceeds the predetermined time may also be employed.

In step S204, the flash MPU 204 obtains the detection result of the proximity detection sensor 212. This detection result of the proximity detection sensor 212 is a detection result obtained after the elapsed time since the user operates the auto bounce driving start button. 213 exceeds the predetermined time.

In step S205, the flash MPU 204 sets a limit angle (restriction angle) for limiting the rotation angle when the flash head unit. 203 is automatically rotated on the basis of the detection result of the proximity detection sensor 212.

For example, in a case where the detection result of the proximity detection sensor 212 indicates "the proximal object exists", it is more likely that the user exists in the vicinity of the proximity detection sensor 212 than a case where the detection result indicates "no proximal object exists". For this reason, in a case where the detection result indicates "the proximal object exists" when the flash head unit 203 is rotated considerably towards the back face side of the flash apparatus 200, the user situated close to the back face side of the flash apparatus 200 may be irradiated with the light from the light emission unit 205 in some cases. In view of the above, in a case where the detection result indicates "the proximal object exists", the limit angle is set to be smaller than that in a case where the detection result indicates "no proximal object exists" to make it difficult for the back face side of the flash apparatus 200 to be exposed with the light from the light emission unit 205. In this manner, while the limit angle for limiting the rotation angle when the flash head unit 203 is automatically rotated is changed in accordance with the detection result of the proximity detection sensor 212, it is possible to reduce the probability that the user is irradiated with the light from the lighting apparatus.

In addition, another setting method of the limit angle is conceivable. For example, in the case of the arrangement of the proximity detection sensor 212 according to the present exemplary embodiment, in a case where the detection result of the proximity detection sensor 212 indicates "the proximal object exists", it is highly likely that the user looks into the viewfinder 120 of the camera 100. On the other hand, in a case where the detection result of the proximity detection sensor 212 does not indicate "the proximal object exists", it is conceivable that the user does not look into the viewfinder 120 of the camera 100. The probability that the user is irradiated with the light from the light emission unit 205 when the flash head unit 203 is rotated considerably towards the back face side of the flash apparatus 200 is lower than that in a case where the user looks into the viewfinder 120 of the camera 100 that that in a case where the user does not look into the viewfinder 120. This is because, as illustrated in FIGS. 6A to 6D, in a case where the user looks into the viewfinder 120 of the camera 100, even when the flash head unit 203 is rotated considerably towards the back face side of the flash apparatus 200, the flash head unit 203 does not face the user.

In view of the above, in a case where the detection result does not indicate "the proximal object exists", the limit angle is set to be smaller than that in a case where the detection result indicates "the proximal object exists" to make it difficult for the back face side of the flash apparatus 200 to be irradiated with the light from the light emission unit 205.

It should be noted that the setting of the limit angle in step S205 may be avoided in a case where the limit angle is set to be larger among a case where the detection result indicates "the proximal object exists" and a case where the detection result does not indicate "the proximal object exists". For example, in a case where rotation can be performed in a range of 120 degrees in the up direction by a mechanical structure, even when the limit angle is not electrically set as 120 degrees in step S205, since the rotation angle in the up direction is previously limited at 120 degrees, the processing in step S205 is not needed.

As described above, in any of the setting methods, while the limit angle for limiting the rotation angle when the flash head unit 203 is automatically rotated is changed in accordance with the detection result of the proximity detection sensor 212, it is possible to reduce the probability that the user is irradiated with the light from the lighting apparatus.

In step S206, the flash MPU 204 instructs the bounce driving control unit 209 to more the flash head unit 203 such that the irradiation direction of the light from the light emission unit 205 is set to be an opposite direction (ceiling direction) to the gravity direction.

Subsequently, the flash MPU 204 emits light from the light emission unit 205 and calculates a distance of the object irradiated with the light of the light emission unit 205 on the basis of the measurement result measured by the distance measurement photometry unit 208 when the light of the light emission unit 205 is emitted. Thereafter, the flash MPU 204 transmits the end notification indicating that the series of processing for calculating the distance of the object irradiated with the light of the light emission unit 205 is ended to the camera 100.

In step S207, the flash MPU 204 instructs the bounce driving control unit 209 to move the flash head unit 203 such that the irradiation direction of the light from the light emission unit 205 is set as a shooting direction (front direction). It should be noted that, according to the present exemplary embodiment, a configuration is adopted in which the irradiation direction corresponds to the shooting direction in a case where the position of the flash head unit 203 is at the reference position. In view of the above, the flash MPU 204 calculates a movement amount of the flash head unit 203 used for causing the irradiation direction to face the front direction on the basis of the information related to the orientation of the flash main body unit 201 and the current position of the flash head unit 203. The information related to the orientation of the flash main body unit 201 is the detection result of the orientation detection unit 116.

Subsequently, the flash MPU 204 emits light from the light emission unit 205 and calculates a distance of the object irradiated with the light of the light emission unit 205 on the basis of the measurement result measured by the distance measurement photometry unit 208 when the light of the light emission unit 205 is emitted. Thereafter, the flash MPU 204 transmits the end notification indicating that the series of processing for calculating the distance of the object irradiated with the light of the light emission unit 205 is ended to the camera 100.

In step S208, the flash MPU 204 instructs the bounce angle calculation unit 211 to determine an angle of the flash head unit 203 appropriate for the bounce flash shooting, that is, the angle of the flash head unit 203 for the bounce flash shooting (irradiation direction of the light from the light emission unit 205). The bounce angle calculation unit 211 determines the angle of the flash head unit 203 for the bounce flash shooting on the basis of the limit angle set in step S205 and the distances in the two directions of the object obtained in steps S206 and S207.

In this step S208, the bounce angle calculation unit 211 determines an angle of the flash head unit 203 for the bounce flash shooting in a range without exceeding the limit angle set in step S204. For example, in a case where the angle determined by the above-described expression (1) on the basis of the two distances obtained in steps S206 and S207 is set as 100 degrees in the up direction, if the limit angle in the up direction set in step S205 is 90 degrees, the angle of the flash head unit 203 is determined as 90 degrees. In addition, as described above, in a case where the limit angle is not set in step S205, the angle of the flash head unit 203 is determined within the range limited by the mechanical structure in which the rotation can be performed.

In step S209, the flash MPU 204 instructs the bounce driving control unit 209 to move the flash head unit 203 such that the angle determined by the angle of the flash head unit 203 in step S208 is set. Thereafter, the flash MPU 204 transmits an end notification indicating that the flash head unit 203 is moved to set the angle determined in step S208 to the camera 100.

In step S210, the flash MPU 204 checks a flash instruction from the camera 100. When the flash instruction from the camera 100 (a pre-flash instruction or a main flash instruction) and the light emission amount at the time of this flash are obtained, the flow shifts to step S211, and when the flash instruction and the light emission amount are not obtained, the check of the flash instruction is continued.

In step S211, the flash MPU 204 causes the light emission unit 205 to emit light on the basis of the instructed flash pattern (pre-flash or main flash) and the light emission amount.

In step S212, the flash MPU 204 returns to step S210 in a case where the flash instruction checked in step S210 is the pre-flash instruction, and the flash MPU 204 ends the processing related to the bounce flash shooting in a case where the flash instruction checked in step S210 is the main flash instruction.

As described above, according to the present exemplary embodiment, the proximity detection sensor 212 is provided on the back face of the flash apparatus 200, and the limit angle for limiting the rotation angle when the flash head unit 203 is automatically rotated is changed in accordance with the detection result of the proximity detection sensor 212. For this reason, it is possible to reduce the probability that the user is irradiated with the light from the lighting apparatus. In addition, the detection range of the proximity detection sensor 212 is inclined downwardly. For this reason, the user looking into the viewfinder 120 of the camera 100 can be accurately detected by the proximity detection sensor 212 irrespective of the orientation at the time of the use of the flash apparatus 200, it is possible to further reduce the probability that the user is irradiated with the light from the lighting apparatus.

In addition, while the flash head unit 203 is automatically rotated by operating the operation unit provided on the back face of the flash apparatus 200, the limit angle is not set by using the detection result of the proximity detection sensor 212 until the predetermined time elapses since the operation unit is operated. For this reason, the setting of the limit angle in accordance with the detection result that may be inaccurate can be avoided, and it is possible to further reduce the probability that the user is irradiated with the light from the lighting apparatus.

Hereinafter, a modified example 1 of the flash apparatus corresponding to the lighting apparatus will be described with reference to FIG. 10. In the following explanation of the modified example 1, components different from those according to the above-described exemplary embodiment will be described in detail, and descriptions of components similar to those according to the above-described exemplary embodiment will be omitted.

Figure 10:
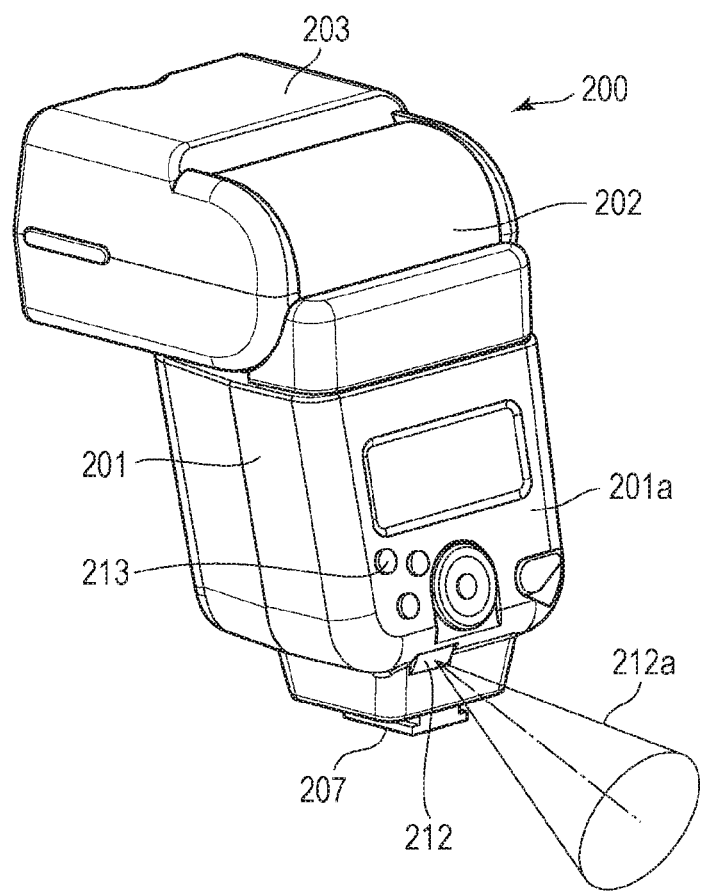
FIG. 10 illustrates a modified example 1 of the lighting apparatus.

According to the modified example 1 illustrated in FIG. 10, the proximity detection sensor 212 is arranged in the vicinity of the area above the camera connection unit 207 in the main body unit operation face 201a of the flash main body unit 201 and also at a position shifted by a predetermined distance on the left side from the center of the main body unit operation face 201a as seen from the user.

In the flash apparatus 200 described with reference to FIG. 3 and the like, the proximity detection sensor 212 is arranged in the vicinity of the area above the camera connection unit 207 and also at the center of the left and right directions of the main body unit operation face 201a. However, the proximity detection sensor 212 may be arranged at a position shifted in the left and right directions as illustrated in FIG. 10 as long as the detection range 212a of the proximity detection sensor 212 can be set as the range in which the user (photographer) P can be sufficiently detected. While the arrangement of the proximity detection sensor 212 has a degree of freedom as described above, a more advantageous arrangement can be realized in terms of downsizing of the flash apparatus 200.

In addition, according to the modified example 1 the proximity detection sensor 212 is arranged at the position shifted by the predetermined distance on the left side from the center of the main body unit operation face 201a, but the proximity detection sensor 212 may be arranged at a position shifted by a predetermined distance on the right side from the center of the main body unit operation face 201a.

Furthermore, the arrangement of the proximity detection sensor 212 may be determined by taking into account a design of the camera to which the flash apparatus is attached. For example, in a case where the accessory shoe of the camera is shifted on the left side with respect to the shooting optical axis as seen from the back face side of the camera, the position of the flash apparatus attached to the accessory shoe of this camera is also shifted on the left side with respect to the shooting optical axis. When the user looks into the viewfinder of the camera having the above-described configuration, the shift between the position of the face of the user and the shooting optical axis is smaller in a case where the user looks into the viewfinder by the left eye than that in a case where the user looks into the viewfinder by the right eye, and it is easier for the user to hold the camera. For this reason, when the flash apparatus is supposed to be attached to the camera having the above-described configuration, the user can be more accurately detected in a case where the proximity detection sensor 212 is arranged at a position shifted on the right side from the center of the main body unit operation face 201a than a case where the proximity detection sensor 212 is arranged at a position shifted on the left side from the center of the main body unit operation face 201a. As an alternative to the above-described configuration, when the flash apparatus is supposed to be attached to the camera having a configuration in which the position of the accessory shoe and the position of the viewfinder are shifted from each other as seen from the back face side, the arrangement of the proximity detection sensor 212 may be determined by taking into account the relationship between the position of the accessory shoe and the position of the viewfinder. When the flash apparatus is attached to this accessory shoe, it is easier for the user looking into the viewfinder to enter the detection range 212a of the proximity detection sensor 212 in a case where the proximity detection sensor 212 is arranged at a position on a side closer to the viewfinder from the center of the main body unit operation face 201a.

As described above, the arrangement of the proximity detection sensor 212 is not limited to the center of the left and right directions of the main body unit operation face 201a.

Hereinafter, a modified example 2 of the flash apparatus corresponding to the lighting apparatus will be described with reference to FIG. 11. In the following explanation of the modified example 2, components different from those according to the above-described exemplary embodiment will be described in detail, and descriptions of components similar to those according to the first exemplary embodiment will be omitted.

Figure 11:
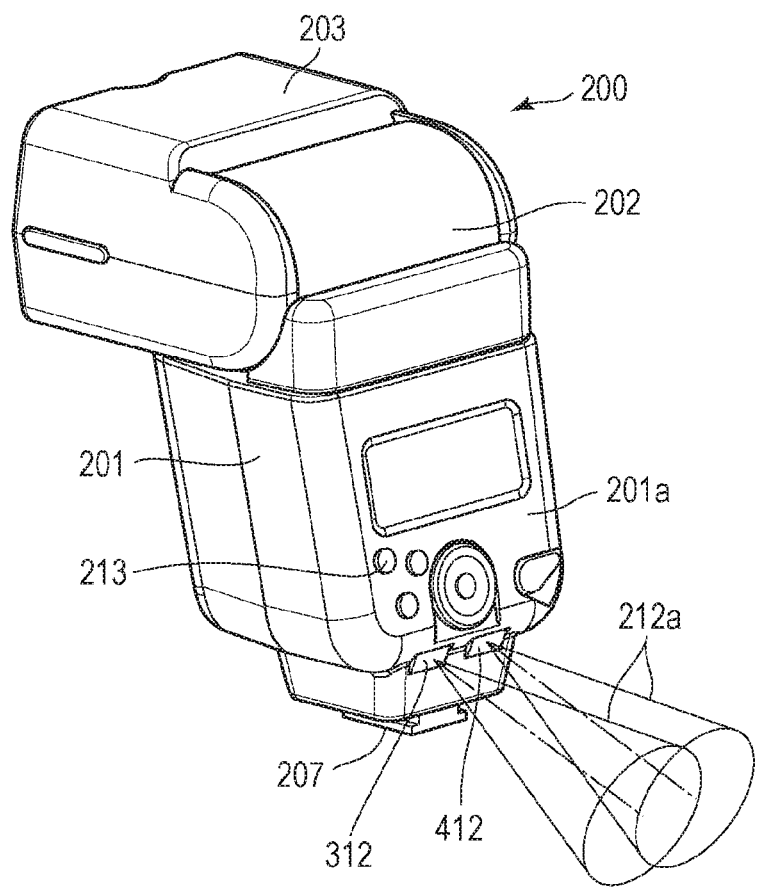
FIG. 11 illustrates a modified example 2 of the lighting apparatus.

In the modified example 2 illustrated in FIG. 11, proximity detection sensors 312 and 412 are arranged in the vicinity of the area above the camera connection unit 207 in the main body unit operation face 201a of the flash main body unit 201 and also on both of the left and right sides so as to sandwich the center of the main body unit operation face 201a.

The detectable range is widened by providing the plurality of proximity detection sensors as in the modified example 2, and it is possible to accurately detect the user looking into the viewfinder 120. It should be noted that the proximity detection sensors 312 and 412 according to the modified example 2 may be similar to the proximity detection sensor 212. In addition, according to the modified example 2, the configuration, in which the two proximity detection sensors are provided has been described as the configuration example in which a plurality of proximity detection sensors are provided, but a configuration in which three or more proximity detection sensors are provided may also be adopted.

It should be noted that the processing executed by the flash apparatus 200 according to the above-described exemplary embodiment and the modified examples 1 and 2 may be executed by the camera 100, and the camera 100 may perform various controls on the flash apparatus 200. For example, the reflected light from the object irradiated with the light of the light emission unit 205 is measured by the photometry sensor 113 provided to the photometry unit 112, and a distance is calculated by the camera MPU 101 on the basis of the measurement result. Subsequently, the camera MPU 101 determines the angle of the flash head unit 203 optimal for the bounce flash shooting and instructs an instruction from the camera 100 to the flash apparatus 200 such that the angle is set as the determined angle. In addition, the detection result of the proximity detection sensor 212 is received from the flash apparatus 200, the limit angle is set by the camera MPU 101 on the basis of the received information. An instruction is transmitted from the camera 100 to the flash apparatus 200 such that the flash head unit 203 is rotated within the set range of the limit angle. That is, the camera. 100 may change the limit angle for limiting the rotation angle when the flash head unit 203 is automatically rotated in accordance with the detection result of the proximity detection sensor 212.

In addition, according to the above-described exemplary embodiment and the modified examples 1 and 2, the example of the lighting apparatus has been described in which the irradiation direction of the light from the light emission unit can be changed in the up and down directions and the left and right directions of the lighting apparatus, but a lighting apparatus in which either the up and down directions or the left and right directions can be changed may also be used.

Furthermore, according to the above-described exemplary embodiment and the modified examples 1 and 2, the example has been described in which only the auto bounce driving start button 213 is provided as the operation unit configured to start the auto bounce operation, but a configuration in which a plurality of operation units configured to start the auto bounce operation are provided may also be adopted. In that case, a length of the period in which the detection result of the proximity detection sensor 212 is not used may be changed in accordance with a relative position of the operation unit configured to start the auto bounce operation and the proximity detection sensor 212. The start of the auto bounce operation is more delayed as the period in which the detection result of the proximity detection sensor 212 is not used is longer, and therefore the period in which the detection result of the proximity detection sensor 212 is not used is preferably shorter. However, as described above, when the period in which the detection result of the proximity detection sensor 212 is not used is short, an erroneous detection may occur in the proximity detection sensor 212 at the time of the operation of the operation unit in some cases. The probability that the erroneous detection may occur in the proximity detection sensor 212 at the time of the operation of the operation unit varies in accordance with the relative position of the operation unit and the proximity detection sensor 212. For example, the probability that the hand of the user enters the detection range 212a of the proximity detection sensor 212 is higher in a case where a second operation close to the proximity detection sensor 212 is operated than that in a case where a first operation unit far from the proximity detection sensor 212 is operated. In view of the above, the period in which the detection result of the proximity detection sensor 212 is not used may be set to be longer in a case where the second operation unit is operated to start the auto bounce operation than that in a case where the first operation unit is operated to start the auto bounce operation. Specifically, in step S203 of FIG. 9, the flash MPU 204 may set the predetermined time to be longer in a case where the second operation unit is operated to start the auto bounce operation than that in a case where the first operation unit is operated to start the auto bounce operation.

In a case where a start instruction of the auto bounce operation can be transmitted from the camera 100 to the flash apparatus 200 by operating the camera 100, the probability that the hand of the user enters the detection range 212a of the proximity detection sensor 212 at the time of the operation for starting the auto bounce operation is low. In view of the above, when the start instruction of the auto bounce operation is transmitted from the camera 100 to the flash apparatus 200 by operating the camera 100, the period in which the detection result of the proximity detection sensor 212 is not used since the start instruction of the auto bounce operation is received may be shortened. Specifically, in step S201 of FIG. 9, the flash MPU 204 checks whether or not the start instruction of the auto bounce operation is received, by the flash apparatus 200 from the camera 100. Subsequently, in step S203, the flash MPU 204 sets a length of a period (second period) in which the detection result of the proximity detection sensor 212 is not used since the start instruction of the auto bounce operation is received. When the period in which the detection result of the proximity detection sensor 212 is not used since the auto bounce driving start button 213 is operated is set as a first period, the length of the second period is set to be shorter than the length of the first period.

The exemplary embodiments of the present invention have been described above, but the present invention is not limited to these exemplary embodiments, and various modifications and alterations can be made within a scope of the gist of the present invention.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment (s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blue-ray Disc (BD)™), a flash memory device, a memory card, and the like.

While the present invention has been described with reference to exemplary embodiments, it is to be understood that the invention is not limited to the disclosed, exemplary embodiments. The scope of the following claims is to be accorded the broadest interpretation so as to encompass all such modifications and equivalent structures and functions.

This application claims the benefit of Japanese Patent Application No. 2015-095236, filed May 7, 2015, which is hereby incorporated by reference herein in its entirety.

What is claimed is:

1. A lighting apparatus comprising:
a first housing detachably attached to an image pickup apparatus;
a second housing rotatable with respect to the first housing;
a light emission unit provided to the second housing;
a driving unit configured to rotate the second housing with respect to the first housing;
a sensor configured to output information related to whether or not an object exists in a predetermined range;
an operation unit configured to instruct the driving unit to rotate the second housing; and
a setting unit configured to set a limit angle of rotating the second housing by the driving unit with respect to the first housing in accordance with the information output from the sensor,
wherein the setting unit does not set the limit angle in accordance with the information output from the sensor until an elapsed time since the operation unit is operated exceeds a predetermined time, and the setting unit sets the limit angle in accordance with the information output from the sensor after the elapsed time since the operation unit is operated exceeds the predetermined time.

2. The lighting apparatus according to claim 1, further comprising:
a connection unit provided on a lower face of the first housing and used for attaching the first housing to the image pickup apparatus, wherein the operation unit is arranged at a position farther from the connection unit than the sensor.

3. The lighting apparatus according to claim 1, wherein the operation unit is arranged at a position on a left side of a position where the sensor in the first housing is provided as seen from a side where the sensor in the first housing is provided.

4. The lighting apparatus according to claim 1, wherein the operation unit includes a first operation unit configured to instruct the driving unit to rotate the second housing and a second operation arranged at a position closer to the sensor than the first operation unit, and wherein the setting unit sets the predetermined time to be longer in a case where the second operation is operated than that in a case where the first operation unit is operated.

5. The lighting apparatus according to claim 1, wherein, in a case where an instruction for rotating the second housing by the driving unit is received from the image pickup apparatus attached to the first housing, the setting unit sets a length of a period in which the limit angle is not set in accordance with the information output from the sensor since the instruction is received to be shorter than the predetermined time.

6. The lighting apparatus according to claim 1, wherein the sensor is arranged on a back face of the first housing.

7. A control method for a lighting apparatus including a first housing detachably attached to an image pickup apparatus, a second housing rotatable with respect to the first housing, a light emission unit provided to the second housing, a driving unit configured to rotate the second housing with respect to the first housing, a sensor configured to output information related to whether or not an object exists in a predetermined range, an operation unit configured to instruct the driving unit to rotate the second housing, a setting unit configured to set a limit angle of rotating the second housing by the driving unit with respect to the first housing in accordance with the information output from the sensor, the control method comprising:

avoiding setting the limit angle in accordance with the information output from the sensor until the elapsed time since the operation unit is operated exceeds a predetermined time; and setting the limit angle in accordance with the information output from the sensor after the elapsed time since the operation unit is operated exceeds the predetermined time.

* * * * *